H. P. MERTEL & E. WENDLAND.
EXHILARATOR FOR COMBUSTION ENGINES.
APPLICATION FILED JUNE 2, 1915.
1,181,606. Patented May 2, 1916.
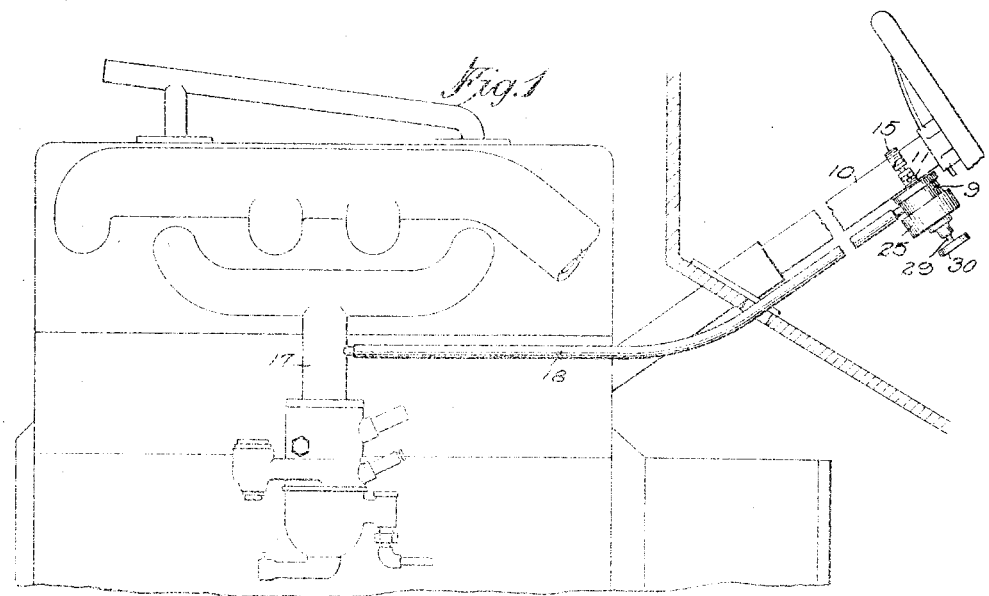
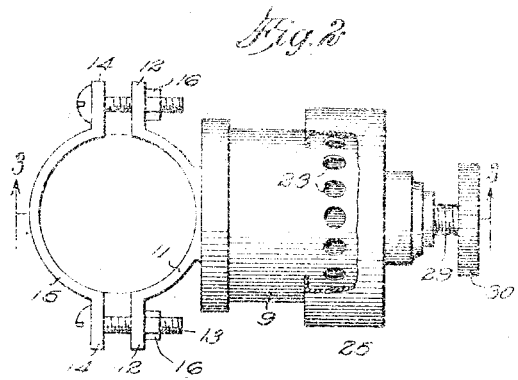
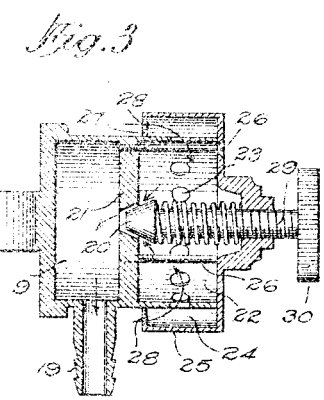
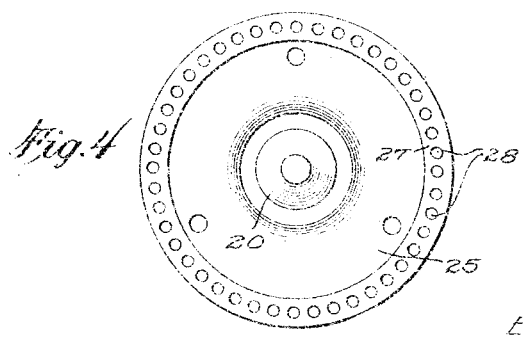
WITNESSES
INVENTORS
H. P. Mertel
Emil Wendland
BY
ATTORNEYS

UNITED STATES PATENT OFFICE.

HENRY P. MERTEL, OF HOMESTEAD, AND EMIL WENDLAND, OF WEST HOBOKEN, NEW JERSEY.

EXHILARATOR FOR COMBUSTION-ENGINES.

1,181,606.  Specification of Letters Patent.  Patented May 2, 1916.

Application filed June 2, 1915. Serial No. 31,684.

*To all whom it may concern:*

Be it known that we, HENRY P. MERTEL, a subject of the Emperor of Austria-Hungary, and EMIL WENDLAND, a citizen of the United States, and residents, respectively, of Homestead and West Hoboken, in the county of Hudson and State of New Jersey, have invented a new and Improved Exhilarator for Combustion-Engines, of which the following is a full, clear, and exact description.

Among the principal objects which the present invention has in view are: to provide means for admitting atmospheric air to the manifold of an engine of the character mentioned and intermediate the explosion chambers and carbureter thereof, for increasing at will the air content of the fuel charge; to provide means for manually varying and controlling the proportion of air included in the charge; to provide means for controlling the proportion in the manner mentioned in position convenient for the operator; and to provide means for dissipating the effect of a back fire of the engine.

*Drawings.*—Figure 1 is a side view of an engine of the character mentioned, showing in conjunction therewith, a carbureter, manifold and exhilarator, constructed and arranged in accordance with the present invention; Fig. 2 is a detail view on an enlarged scale of the exhilarator control box, part of the wall of the dissipating casing thereof being cut away; Fig. 3 is a section thereof, taken as on the line 3—3 in Fig. 2; and Fig. 4 is a detail view on an enlarged scale, showing the outer dissipating casing.

*Description.*—As seen in the drawings, the exhilarator is provided with a control box 9, which may be clamped to the steering post 10 of an automobile by a suitable clamp. The clamp shown in the drawings, is a collar section 11, formed integrally with the base of the box 9, bolting brackets 12 being extended therefrom, to receive the bolts 13. The brackets 12 correspond with brackets 14 of a collar section 15, through which the said bolts are also passed. When the two sections are drawn by the manipulation of the screw nuts 16 on the steering post 10, the box 9 is held rigidly in service position.

The box 9 is maintained in open communication with the manifold 17 by a suitable flexible pipe 18. The pipe 18 if formed of rubber is held on the grooved nipple 19, with which the box 9 is furnished. The communication thus established between the box 9 and manifold 17, results in admitting air to said manifold when the same is admitted to the box. This result arises when the valve 20 is lifted from the seat formed therefor in the partition 21, dividing the box 9 into an inner supply and outer distributing section 22. The side wall of the distributing section 22, is pierced to form a series of perforations 23, through which air is admitted to the distributing section but by which the hot or flaming gases are partly dissipated in the event of a back fire occurring in the engine. The air thus supplied to the section 22 is drawn from an annular chamber 24 formed by the dissipating casing 25, as best seen in Fig. 3 of the drawings.

The casing 25 is held on the box 9 by screw bolts 26, the threaded portions of said bolts engaging tapped perforations formed in the partition 21, as shown best in Fig. 3 of the drawings. The casing 25 forms the top or cover of the section 22 and chamber 24. It also forms the bottom of the chamber 24, having to this end, an inturned flange 27. The flange 27 is furnished with a multiplicity of small perforations 28. When air is being admitted into the box 9 through the two sets of perforations 28 and 23, the arrangement referred to avoids any whistling or sucking sound. When, however, due to a back fire, hot or flaming gases are forced outward from the box 9, through the section 22 and chamber 24, the gases are split up into a number of relatively harmless jets, which become extinguished immediately on passing the relatively small perforations 28. The valve 20 is moved to and from its seat by manipulating a screw 29, said screw being provided with a knurled head 30 extending beyond the casing 25 and in position convenient to the hand of the driver of the automobile on which the exhilarator is installed.

*Operation.*—When in service, the exhilarator is operated as follows: When the motor is started, the screw 29 and head 30 thereof are manipulated to seat the valve 20. In this condition, the fuel delivered by the carbureter with which the said motor is equipped, is unaltered. When in the operation of the automobile, the motor is working smoothly, the driver manipulates the screw 29 to lift the valve 20 from its seat. The air from the section 22 is permitted to be drawn through the pipe 18 to the manifold 17 and from thence into the cylinders of the motor. The air thus introduced is added to the fuel delivered by the carbureter. This results in a considerable saving in the explosive fuel consumed. If the impoverishment of the fuel which results from the admission of atmospheric air be too great, this may be immediately corrected by the manipulation of the screw 29.

Claims:

1. An apparatus as characterized comprising a supply pipe for introducing air to the manifold of an explosive engine; a supply casing therefor having a distributing section and a partition embodying a valve seat separating said section and pipe; a manually-manipulated valve for varying the opening of said valve seat; and a dissipating casing encircling said distributing section and having an edge opening to be turned from the operator when the apparatus is in service.

2. An apparatus as characterized comprising a supply pipe for introducing air to the manifold of an explosive engine; a supply casing therefor having a distributing section and a partition embodying a valve seat separating said section and pipe; a manually-manipulated valve for varying the opening of said valve seat; means embodying a screw directly connected with said valve for adjusting the same; and a dissipating casing surrounding said distributing section for forming a dissipating chamber annularly disposed with reference to said section, said chamber embodying a series of perforations communicating with said chamber and section and with said chamber and the surrounding air.

3. An apparatus as characterized comprising a supply pipe for introducing air to the manifold of an explosive engine; a supply casing therefor having a distributing section and a partition embodying a valve seat separating said section and pipe; a manually-manipulated valve for varying the opening of said valve seat; and a chamber annularly disposed with reference to said section, said chamber embodying a series of perforations communicating with said chamber and section and a second series of perforations communicating with said chamber and the surrounding air.

In witness whereof we have signed our names to this specification in the presence of two subscribing witnesses.

HENRY P. MERTEL.
EMIL WENDLAND.

Witnesses:
  E. F. MUNDORF,
  PHILIP D. ROLLHAUS